United States Patent
Iizuka

[19]

[11] Patent Number: 5,882,277
[45] Date of Patent: Mar. 16, 1999

[54] SPEED CHANGE CONTROL APPARATUS OF AUTOMATIC TRANSMISSION

[75] Inventor: Naonori Iizuka, Fuji, Japan

[73] Assignee: JATCO Corporation, Fuji, Japan

[21] Appl. No.: 917,135

[22] Filed: Aug. 25, 1997

[30] Foreign Application Priority Data

Sep. 19, 1996 [JP] Japan .................................. 8-248280

[51] Int. Cl.⁶ ................................................ F16H 61/16
[52] U.S. Cl. ............................................. 477/125; 701/52
[58] Field of Search .................... 477/125, 154; 701/52

[56] References Cited

U.S. PATENT DOCUMENTS

| 5,009,128 | 4/1991 | Seidel et al. | 477/154 |
| 5,070,740 | 12/1991 | Giek et al. | 74/473 |
| 5,127,288 | 7/1992 | Hojo et al. | 477/125 |
| 5,351,570 | 10/1994 | Mizunuma et al. | 477/125 |
| 5,545,108 | 8/1996 | Wagner et al. | 477/125 |
| 5,549,519 | 8/1996 | Seidel et al. | 477/125 |
| 5,586,029 | 12/1996 | Schulz et al. | 477/125 |
| 5,738,607 | 4/1998 | Konod et al. | 477/125 |

FOREIGN PATENT DOCUMENTS 61-169269 10/1986 Japan .
2-8545 1/1990 Japan .

*Primary Examiner*—Dirk Wright
*Attorney, Agent, or Firm*—Foley & Lardner

[57] ABSTRACT

When a speed ratio is selected manually by an operator of a vehicle, an upshift command is generated if the engine speed exceeds a predetermined maximum value. Further manual upshifts and downshifts are inhibited for a predetermined time period. The time period is a function of at least one of the current engaged gear ratio, engine throttle position, and the amount of time it takes to upshift the transmission.

3 Claims, 4 Drawing Sheets

SPEED CHANGE CONTROL APPARATUS OF AUTOMATIC TRANSMISSION

BACKGROUND OF THE INVENTION

1. Field of the Invention

The present invention relates to a speed change control apparatus of an automatic transmission capable of selecting between an auto-mode performing a speed change on the basis of a running condition and a manual mode performing a speed change on the basis of a manual manipulation.

2. Description of Related Art

As conventional speed change control apparatuses of an automatic transmission, there is one, for example, disclosed in Japanese Patent Laid Open Publication Hei No. 2-8545.

This conventional apparatus is constructed, on the basis of a shift apparatus provided in a normal automatic transmission, a manual shift function including a plus sensor outputting an up-shift signal and a minus sensor outputting a down-shift signal is added to operate such that a shift lever is moved from a "D" range position which selects a normal running to a manual shift position, and here, a speed change stage of the transmission is shifted up by one speed to a higher speed side by operating the plus sensor, conversely, the speed change stage is shifted down by one speed by operating the minus sensor.

In the conventional speed change control apparatus of an automatic transmission mentioned above, it is advantageous in that under a running condition in the auto-mode by selecting the "D" range, it is possible to perform the up-shift and the down-shift by switching to the manual mode so that the speed change stage can be selected in accordance with a preference of a driver. However, an unsolved problem is involved in that there is a fear of causing an overspeed condition of the engine due to the down-shift by the manual manipulation.

In order to solve this unsolved problem, it is considered as disclosed, for example, in Japanese Utility Model Laid Open Publication No. 61-169629, to suppress the overspeed of the engine by automatically up-shifting the automatic transmission having priority over a normal speed change judgement when it is detected or predicted that the engine will be in the overspeed condition.

However, in this case, since the up-shift to suppress the overspeed of the engine is automatically performed independent of the driver's manipulation, when the up-shift to suppress the overspeed of the engine and the up-shift in the manual mode performed by the driver's intention are duplicated or repeated within a short time period, it will result in the up-shift of two speeds, and thus, the acceleration intended by the driver is not obtained and the driver will feel discrepancy or dissatisfaction. Conversely, when the down-shift in the manual mode is performed by the driver's intention just after the up-shift to suppress the overspeed of the engine is performed, it will become impossible to suppress the overspeed of the engine, and thus posing a new problem.

SUMMARY OF THE INVENTION

The present invention was made in view of the unsolved problems in the conventional apparatus, and it is an object to provide a speed change control apparatus of an automatic transmission which enables to perform a manual manipulation without causing the driver to feel discrepancy or dissatisfaction while suppressing the overspeed of the engine reliably.

In order to achieve the above object, in a first aspect of the invention, a speed change control apparatus of an automatic transmission capable of selecting between automatic speed change means for setting a speed change stage automatically in accordance with a running condition and manual speed change means for setting a speed change stage selected by a manual manipulation, comprises, shift control means for shifting to a speed change stage set by the automatic speed change means or by the manual speed change means, engine speed detecting means for detecting an engine speed, overspeed suppressing means for sending an up-shift command to the shift control means when an engine speed detection value of the engine speed detecting means exceeds a preset overspeed, and shift inhibiting means for inhibiting shift of the shift control means at least by the manual speed change means until a predetermined time elapses from the sending of the up-shift command by the overspeed control means.

In the first aspect of the invention, when an engine speed is equal to or lower than the overspeed and hence within a normal range, shift up or shift down to a speed change stage set by the manual speed change means is allowed, however, when an engine speed detection value exceeds the overspeed, the overspeed suppressing means sends an up-shift command to the shift control means so that the engine speed is lowered to fall within a normal range. At this time, the shift inhibiting means inhibits the shift of the shift control means effected by the manual speed change means, and hence it is prevented that the up-shift operation is eventually performed two stages to make the driver feel discrepancy or dissatisfaction, and that the engine speed exceeds the overspeed due to the down-shift operation.

In the second aspect of the invention, the predetermined time period of the shift inhibiting means is set in accordance with at least one of the speed change stage and the degree of opening of the throttle at the present time.

In the third aspect of the invention, the predetermined time period of the shift inhibiting means is set so that it substantially coincides with a speed change time from the start of speed change until the speed change is completed.

DESCRIPTION OF THE PREFERRED EMBODIMENTS

Embodiments of the present invention will be described with reference to the drawings.

Figure 1:
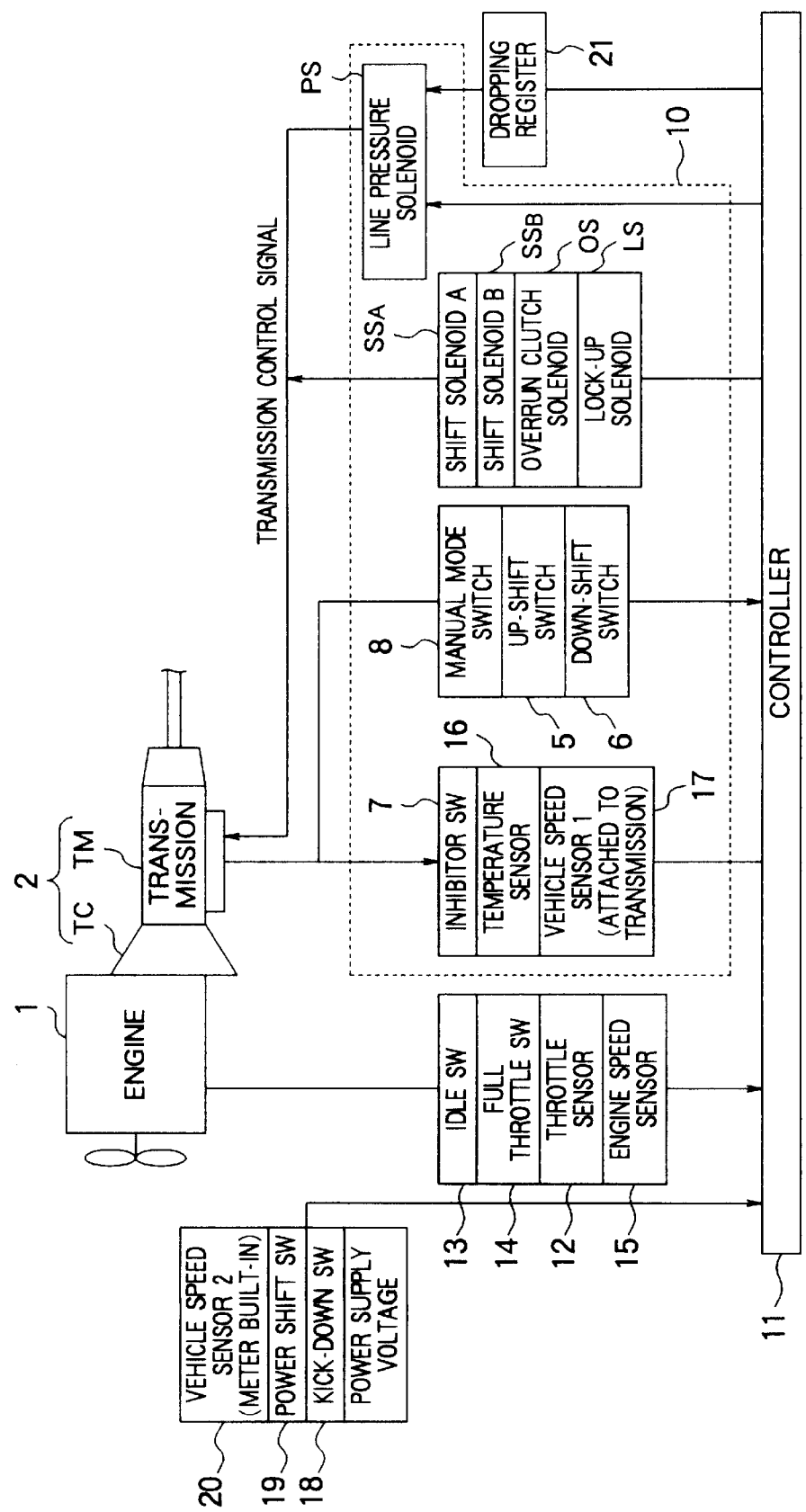
FIG. 1 is a schematic configuration diagram of an embodiment of the present invention.

FIG. 1 is a schematic configuration diagram showing an embodiment of the present invention, and an automatic transmission 2 is connected to an output side of an engine 1.

The automatic transmission 2 is constituted by a torque converter TC having a lock-up piston built therein, and a speed change mechanism (transmission) TM connected to the output side of the torque converter TC.

The speed change stages of the automatic transmission 2 are selected by a selecting mechanism 4. This selecting mechanism 4, as shown in FIG. 2, includes a main guide path 4*b* having a normal parking range "P", reverse range "R", neutral range "N", drive range "D", second range "2", and first range "1" arranged in this order in a row in a front to rear direction (longitudinal direction) of a vehicle and guiding a selecting lever 4a, and further includes a subguide path 4c extending respectively in a front direction and a rear direction in parallel to the main guide path 4b from a lateral point corresponding to the drive range "D" and having an up-shift range "+" and a down-shift range "−" located opposing to each other in the front and rear direction in the subguide path 4c, and a connection path 4d extending laterally from the drive range "D" to the lateral corresponding point to connect the main guide path 4b with the subguide path 4c at the lateral point corresponding to the drive range "D".

Figure 2:
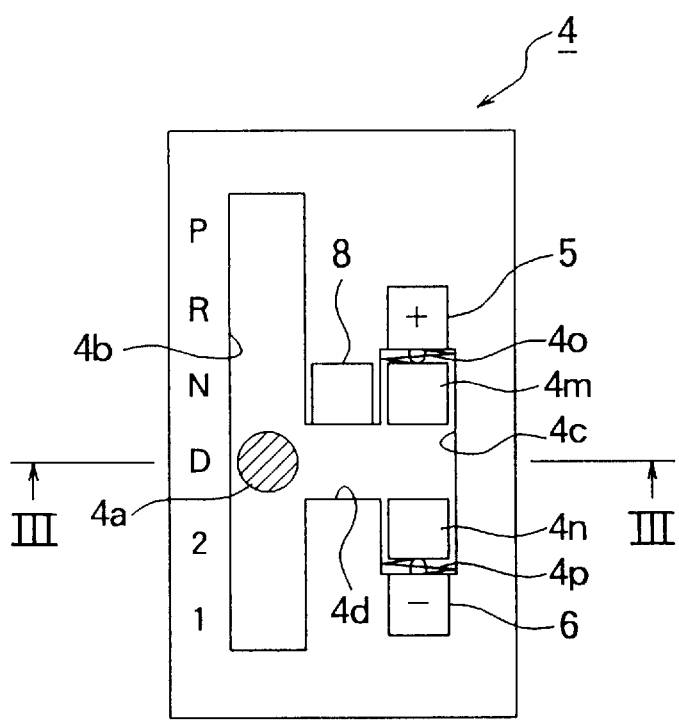
FIG. 2 is a plan view of a selecting mechanism.
Figure 3:
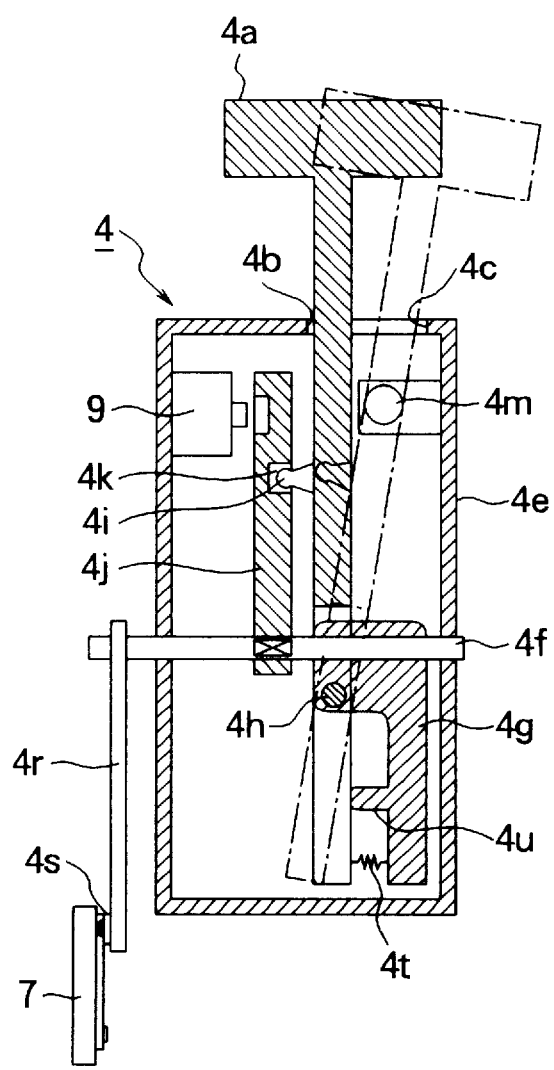
FIG. 3 is a sectional view taken along the line A—A in FIG. 2.

Here, the selecting lever 4a, as shown in FIG. 3, has a lower end portion formed in a fork-shape expanding in the longitudinal direction of the selecting mechanism 4 in FIG. 2, and this fork-shaped portion is rotatably (in clockwise and counterclockwise directions) supported by a supporting shaft 4h which penetrates a rotatable supporting member 4g in the longitudinal direction and is supported thereby. The rotatable supporting member 4g in turn is positioned between two legs of the fork-shaped portion, and is mounted on a rotatable shaft 4f rotatably in a plane containing the longitudinal direction. The rotatable shaft 4f extends in a lateral direction of a case 4e, and is rotatably supported by two side walls of the case 4e. In this respect, the supporting shaft 4h is located below the rotatable shaft 4f. As a result, the selecting lever 4a is rotatable in the longitudinal direction along the main guide path 4b and along the subguide path 4c about the rotatable shaft 4f as a supporting point, and is also rotatable in the lateral direction along the connection path 4d about the supporting shaft 4h as a supporting point.

Under a condition wherein the selecting lever 4a is guided in the main guide path 4b, when an engaging projection 4i provided on the selecting lever 4a is engaged with an engaging groove 4k of a rotatable lever 4i which engages width across flats formed on the rotatable shaft 4f, the rotatable shaft 4f is rotated with the selecting lever 4a as a unit. When the selecting lever 4a is rotated at its drive range "D" in the clockwise direction about the supporting shaft 4h as the supporting point, and is moved to the subguide path 4c side through the connection path 4d, the engaging condition between the engaging projection 4i and the engaging groove 4k is released, and at the same time, a shaft portion of the selecting lever 4a is engaged between switch operating bars 4m and 4n which are provided opposing to each other along the subguide path 4c, and in this condition, when the selecting lever 4a is rotated in the front or rear direction, the up-shift switch 5 (or down-shift switch 6) is turned on through the switch operating bars 4m (or 4n) and further through a return spring 4o (or 4p).

On the other hand, a manipulation lever 4r is attached to a shaft end of the rotatable shaft 4f, and the manipulation lever 4r is connected to an inhibitor switch 7 through a link 4s. The inhibitor switch 7 is attached to the automatic transmission 2. Accordingly, when the selecting lever 4a is rotated along the main guide path 4b, owing to the inhibitor switch 7, a switch signal corresponding to respective range "P", "R", "N", "D", "2", and "1" provided on the main guide path 4b is outputted.

Furthermore, in the connection path 4d, there is provided with a manual mode switch 8 between the main guide path 4b and the subguide path 4c, and this switch is turned on when the selecting lever 4a passes by from the main guide path 4b side to the subguide path 4c side, and it is turned off when the selecting lever 4a passes by in the reverse direction, thereby to detect whether it is a manual manipulation condition or not.

Moreover, the rotatable lever 4j is provided with a selecting lock solenoid 9 to lock the rotatable lever 4j at a position of the drive range "D".

Furthermore, the selecting lever 4a has a return spring 4t at a lower end thereof interposed between the lower end and the rotatable supporting member 4g, so that the selecting lever 4a is biased towards the main guide path 4b, and its biasing position is restricted when the selecting lever 4a abuts against a stopper portion 4u protruding from the rotatable supporting member 4g.

The speed change stages of the automatic transmission 2 are changed over and controlled, as shown in FIG. 1, by shift solenoids $SS_A$, $SS_B$, overrun clutch solenoid OS, and lock-up solenoid LS which control various control valves provided within a control valve unit 10 provided on a lower side of the automatic transmission 2, and by a line pressure solenoid PS which controls a line pressure within a control valve unit 4.

Here, the shift solenoids $SS_A$ and $SS_B$ control the speed change stages of the automatic transmission 2, that is, speed change point gear positions corresponding to a vehicle running condition in accordance with control signals from the controller 11 which will be described later, and the gear position is at the first speed position when both the shift solenoids $SS_A$, $SS_B$ are in an ON condition (energized condition), and it occupies the second speed position when the shift solenoid $SS_A$ is OFF condition (non-energized condition) and the shift solenoid $SS_B$ is ON condition, and it occupies the third speed position when both the shift solenoids $SS_A$, $SS_B$ are OFF condition, and it occupies the fourth speed position when the shift solenoid $SS_A$ is ON condition and the shift solenoid $SS_B$ is OFF condition.

Furthermore, similarly, the overrun clutch solenoid OS controls an engine brake effect according to a vehicle running condition by a control signal from the controller 11.

Also, the lock-up solenoid LS is controlled with respect to its duty cycle by a control signal from the controller 11, and by this, the lock-up solenoid LS controls a pilot pressure supplied to a lock-up control valve, and regulates a lock-up pressure.

Furthermore, similarly, the line pressure solenoid PS is controlled with respect to its duty cycle by a control signal from the controller 11, and by this, the line pressure solenoid PS controls a pilot pressure supplied to a pressure modifier valve, and regulates a discharge pressure of a pump within the control valve unit 10 to a line pressure corresponding to a vehicle running condition.

And each of the solenoids $SS_A$, $SS_B$, OS, LS, and PS is electrically controlled by the controller 11.

The controller 11 is constituted, for example, including a microcomputer, and to its input side, there are connected, a throttle sensor 12 for detecting a degree of opening and an opening speed of a throttle valve attached to the engine 1, an idle switch 13 for detecting, when the throttle sensor 12 is abnormal, that the throttle valve is in a completely closed condition, a full throttle switch 14 for detecting, similarly when the throttle sensor 12 is abnormal, that the throttle valve is at about ½ opening degree or larger, and an engine speed sensor 15 as engine speed detecting means for detecting an engine speed.

Furthermore, the input side of the controller 11 is connected with the up-shift switch 5, down-shift switch 6, inhibitor switch 7, and manual mode switch 8 associated with the selecting lever 4a, and furthermore, an oil temperature sensor 16 for detecting a temperature of transmission oil of the automatic transmission 2, and a vehicle speed sensor 17 for detecting a vehicle speed from a rotation of an output shaft of the automatic transmission 2 are connected.

Furthermore, the input side of the controller 11 is connected with a kick-down switch 18 for detecting, when the throttle sensor 12 is abnormal, that an accelerater pedal is at a full opening, a power shift switch 19 for detecting which of a power mode and an auto-mode the driver is selecting, and a vehicle speed sensor 20 built in an alternative speed meter when the speed sensor 17 is abnormal, and also a predetermined power supply voltage is applied from a battery.

On the other hand, to the output side of the controller 11, there are connected with, as described earlier, the shift solenoids $SS_A$ and $SS_B$ for controlling the speed change stages, that is, the gear positions of the automatic transmission 2, the overrun solenoid OS for controlling the engine brake effect of the automatic transmission 2, the lock-up solenoid LS for controlling the lock-up pressure, and the line pressure solenoid PS. Here, a large current is directly supplied to the line pressure solenoid PS at the time of starting a needle valve, but after the starting, a small current is supplied through a dropping resistor 21.

In the controller 11, the microcomputer executes a line pressure control processing for setting a line pressure, primarily on the basis of a throttle opening degree detection value of the throttle sensor 12 and by making reference to a line pressure control map indicating a relation between a throttle opening and a line pressure; a shift pattern control processing for selecting two kinds of running patterns including an economy pattern suitable for normal economic running in which a speed change gear position is set on the basis of a vehicle speed and a throttle opening degree depending on which of the auto and the power is selected by the power shift switch 19 and a power pattern suitable for climbing a slope or acceleration; a lock-up control processing for reducing a slip of the torque converter 2 by reducing an OFF time of the duty cycle of the lock-up solenoid and by fastening a lock-up piston within the torque converter 2 when the auto is selected by the power shift switch 19 and when a vehicle speed is equal to the set vehicle speed or larger during running at the fourth speed in the drive range "D"; an engine brake control processing for preventing idling of the forward one-way clutch in the automatic transmission 2 and for operating engine brake; and a speed change control processing for controlling a speed change stage, that is, a gear position by controlling the shift solenoids $SS_A$ and $SS_B$ by making reference to a speed change characteristic control map which is set on the basis of the vehicle speed and the throttle opening degree.

Here, the line pressure control processing, the shift pattern control processing, the lock-up control processing, and the engine brake control processing are performed in a similar manner as the speed change control apparatus of the normal automatic transmission, and hence, the detailed description as to these processings will be omitted.

Figure 4:
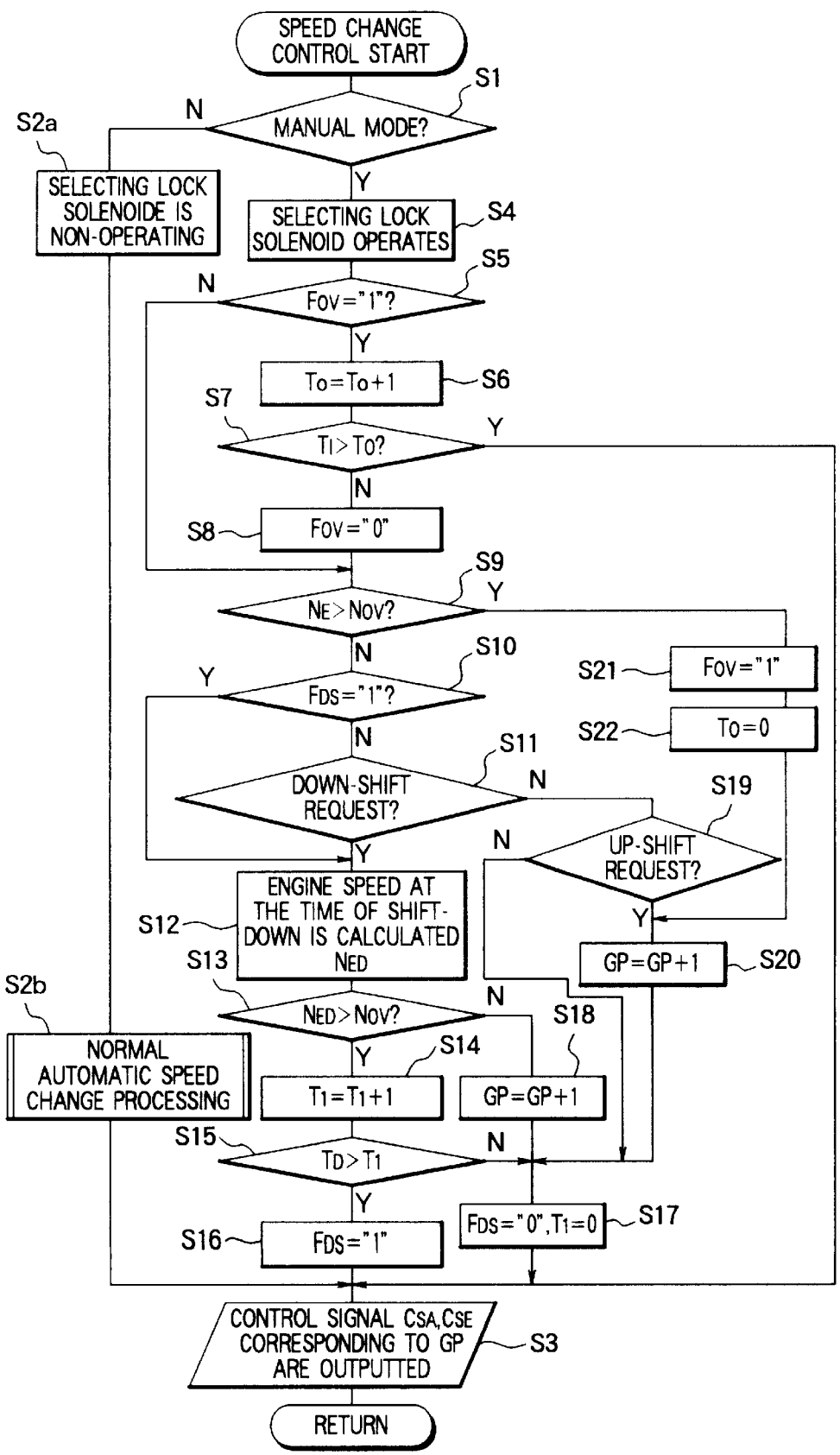
FIG. 4 is a flow chart showing an example of a speed change control processing by a controller.

In the speed change control processing, as shown in FIG. 4, when the manual mode switch 8 is in an OFF condition, a gear position is set by making reference to a normal speed change characteristic control map, and the ON and OFF conditions of the solenoids $SS_A$ and $SS_B$ are controlled in accordance with the set gear position thereby to perform the normal speed change control processing in which the speed change of the automatic transmission 2 is controlled to shift to the set gear position. And when the manual mode switch 8 is in an ON condition, and when the engine speed reaches the overspeed $N_{OV}$ or larger resulting in up-shifting, the up-shift and down-shift are inhibited for a predetermined time period $T_0$. When a request for down-shift is received while this inhibited state is released, the down-shift is inhibited it the engine speed $N_{ED}$ reaches the overspeed $N_{OV}$ or larger upon down shifting, however, if the engine speed $N_{ED}$ decreases to less than the overspeed $N_{OV}$ within a predetermined time period $T_1$, the manual speed change control processing which allows the shift-down is performed at that time point.

Next, the operation in the above-mentioned embodiment will be described with reference to FIG. 4 which shows the speed change control processing executed by a microcomputer contained in the controller 11.

This speed change control processing is executed, for example, as a timer interruption processing at every 10 msec, and first, in step S1, it is determined whether a switch signal of the manual mode switch 8 is in an ON state not. This determination determines whether or not the auto-speed change mode in which the selecting bar 4a is guided in the main guide path 4b has been changed to the manual speed change mode in which the selecting bar 4a is guided in the subguide path 4c, and if the switch signal is in an OFF state, it is determined that the auto-speed change mode is working and the process proceeds to step S2a wherein the supply of a current of a predetermined value to a selecting lock solenoid 9 is stopped to thereby allow the rotation of the rotatable lever 4j and the rotatable shaft 4f. Thereafter, proceeds to step S2b, and the normal automatic speed change control processing is executed.

In this normal automatic speed change control processing, a shift pattern control map corresponding to a specific range is selected on the basis of a switch signal corresponding to a range position from the inhibitor switch 7, and when the selected shift pattern control map is the control map for the "D" range, either the economic pattern speed change control map or the power pattern speed change control map which are selected in the above-mentioned shift pattern control processing is made reference to obtain a gear position GP coincident with the running condition on the basis of the throttle opening degree detection value of the throttle sensor 12 and the vehicle speed detection value of the vehicle speed sensor 19, and the obtained gear position GP is used to update and stored in a preset gear position storage area of a built-in memory.

Subsequently, proceeds to S3, and the gear position stored in the gear position storage area is read, and ON and OFF conditions of control signals for the shift solenoids $SS_A$ and $SS_B$ corresponding to the gear position GP are set, and after the set control signals are supplied to the shift solenoids $SS_A$ and $SS_B$, the timer interruption processing is finished, and returns to a predetermined main program.

On the other hand, if the result of determination in step S1 shows that the switch signal of the manual mode switch 8 is in ON state, it is judged that the selecting bar 4a is moved to the inside of the subguide 4c through the connection path 4d, and proceeds to step S4.

In this step S4, a current of a predetermined value is supplied to the selecting lock solenoid 9 to make it operating state thereby to prevent the rotatable lever 4j and rotatable shaft 4f from being rotated, and after a switch signal of the inhibitor switch 7 is fixed to a switch signal corresponding to the drive range "D", proceeds to step S5.

In this step S5, it is determined whether an overspeed shift flag $F_{OV}$ is set to "1" indicating an up-shift condition due to the overspeed. In this regard, the overspeed shift flag $F_{OV}$ indicates whether the up-shift operation is being done to prevent the overspeed of the engine 1 as described later. It is determined that this overspeed shift flag $F_{OV}$ is reset to "0", it is judged that the up-shift operation to prevent the overspeed is not done, and proceeds directly to step S9 as described later. However, if the overspeed shift flag $F_{OV}$ is set to "1", it is judged that the up-shift operation to prevent the overspeed is being done, and proceeds to step S6.

In this step S6, an up-shift elapsed time $T_0$ from the start of the up-shift to prevent the overspeed, which is stored in an up-shift elapsed time storage area set in the built-in memory is read out, and a value obtained by adding "1" to the up-shift elapsed time $T_0$ is used as a new up-shift elapsed time $T_0$ to update and is stored in the up-shift elapsed time storage area, and then proceeds to step S7.

In the step S7, it is determined whether the up-shift elapsed time $T_0$ is less than a preset shift manipulation inhibition time $T_1$. This shift manipulation prohibition time $T_1$ corresponds to a time required to complete the up-shift operation to prevent the overspeed of the engine 1, and it is set on the basis of the present gear position GP and the throttle opening degree TH.

Accordingly, in the determination process in step S7, it is determined whether the up-shift operation to prevent the overspeed of the engine 1 has been completed, and if the up-shift elapsed time $T_0$ is less than a preset shift manipulation inhibition time $T_1$, the timer interruption processing is finished as it is, and returns to a predetermined main program. When the up-shift elapsed time T0 becomes equal to or larger than the shift manipulation inhibition time $T_1$, it is judged that the up-shift operation to prevent the overspeed of the engine 1 has been completed, and proceeds to step S8 to reset the overspeed shift flag $F_{OV}$ to "0", and then proceeds to step S9.

In this step S9, the present engine speed $N_E$ of the engine speed sensor 15 is read, and it is determined whether this engine speed $N_E$ exceeds the preset overspeed $N_{OV}$, and if $N_E \leq N_{OV}$, it is determined that the rotating condition of the engine 1 is normal, and proceeds to step S10.

In this step S10, it is determined whether a down-shift allowing flag $F_{DS}$ is set to "1". Here, the down-shift allowing flag $F_{DS}$ indicates whether to allow a down-shift request or not when this request is made as will be described later. If this down-shift allowing flag $F_{DS}$ is set to "1", it is determined that the down-shift manipulation is in an allowable condition, and directly proceeds to step S12, and if the down-shift allowing flag $F_{DS}$ is reset to "0", proceeds to step 11, and determines whether the down-shift switch 6 is in an ON condition.

If the result of the determination in step S11 indicates that the down-shift switch 6 is ON condition, it is judged that the driver is making the down-shift request, and proceeds to step S12, and after calculating an engine speed $N_{ED}$ at the time when one speed is shifted down from the present gear position GP, proceeds to step S13.

In this step S13, it is determined whether the engine speed NED at the time of shift-down which is calculated in step S12 exceeds the above-mentioned overspeed $N_{OV}$, and if $N_{ED} > N_{OV}$, it is judged that the engine speed will be in an overspeed condition when the gear position is shifted down, and proceeds to step S14. In step S14, it is read out the down shift request elapsed time $T_1$ representing the elapsed time of the overspeed condition at the time of the down shift request which is stored in the down shift request elapsed time storage area, and a new down shift request elapsed time $T_1$ which is obtained by adding "1" to the read out value is stored as an updated value in the down shift request elapsed time storage area, and then proceeds to step S15.

In step S15, it is determined whether the down shift request elapsed time $T_1$ is less than a preset down shift request effective time $T_D$ at the time when the down shift request is made. Here, the down shift request effective time $T_D$ is set on the basis of the present gear position GR, the throttle opening degree detection value TH of the throttle sensor 12, the deceleration DA, the vehicle speed detection value V of the vehicle speed sensor 17, etc., and the down shift request effective time $T_D$ is set to a longer time as the gear position GR is lower, as the throttle opening degree detection value TH is lower, as the deceleration DA is larger, and as the vehicle speed detection value V is lower.

Accordingly, if the determination result in step S15 indicates that TD>T1, it is judged that it is possible to allow the shift down request, and proceeds to step S16. In step S16, after setting a down-shift allowing flag $F_{DS}$ to "1", proceeds to step S3, and it $T_D \leq T_1$, it is judged that the down-shift request elapsed time $T_1$ is too long and it is in the outside of the down shift request effective time $T_D$ so that it is necessary to release the shift-down request, and proceeds to step S17. In step S17, after the down-shift flag $F_{DS}$ is set to "0" and down-shift request elapsed time $T_1$ is cleared to "0", proceeds to step S3.

On the other hand, it the determination result in step S13 indicates that the engine speed $N_{ED}$ is equal to or lower than the overspeed $N_{OV}$, it is judged that the engine speed is within a normal range even the shift-down is made, and proceeds to step S18. In step S18, the present gear position GP stored in a predetermined storage area is read out, and a value obtained by reducing "1" from the read-out gear position GP is made to be a new gear position GP, and after updating and storing the new gear position GP, proceeds to step S17.

Furthermore, if the determination result in step S11 indicates that the switch signal of the down-shift switch 6 is OFF condition, the process proceeds to step S19 to determine whether the up-shift switch 5 is in an ON condition, and if the up-shift switch 5 is in an OFF condition, it is judged that the shift request is not made, and proceeds to step S17. However, if the up-shift switch 5 is ON condition, it is judged that the driver is requesting the up-shift, and proceeds to step S20. In step S20, the present gear position GR stored in the gear position storage area is read out, and a new gear position is obtained by adding "1" to the read-out gear position. The new gear position is used to update, and is stored in the gear position storage area, and then proceeds to step S17.

Furthermore, if the determination result in the above-mentioned step S9 indicates that the present engine speed $N_E$ exceeds the overspeed $N_{OV}$, it is judged that it is necessary to reduce the engine speed $N_E$ by up-shift, and proceeds to step S21 to set the overspeed shift flag $F_{OV}$ representing the up-shift operating condition to "1", and then proceeds to step S22. In step S22, after the up-shift elapsed time $T_0$ is cleared to "0", proceeds to the above-mentioned step S20 to add one speed to the gear position GP.

In the speed change control processing shown in FIG. 4, the processing in step S2b corresponds to automatic speed change means, the processing in step S5 to step S22 corresponds to manual speed change means, the processing in step S4 to step S8 corresponds to shift inhibiting means, and the processing in step S9, and step S20 to step S22 corresponds to overspeed suppressing means.

Accordingly, now, assuming that the vehicle is forward running by selecting the drive range "D" by the selecting lever 4a, under this condition, since the manual mode switch 8 is in an OFF condition when the speed change control processing in FIG. 4 is performed, the process proceeds from step 1 to step S2a to place the selecting lock solenoid 9 in a non-operating condition, and then proceeds to step S2b. In step S2b, the gear position GP is set by making reference to a speed change control map on the basis of the present vehicle speed detection value V of the vehicle speed sensor 17 and the throttle opening degree detection value TH of the throttle sensor 12, and the set gear position GR is used to update and is stored in the gear position storage area. Then, the process proceeds to step S3.

Accordingly, in step S3, the shift solenoids $SS_A$ and $SS_B$ are ON/OFF controlled so that the automatic transmission 2 assumes a gear position corresponding to the gear position GR updated and stored in the gear position storage area. For example, if the gear position GP is at the fourth speed, a control signal $C_{SA}$ of the solenoid $SS_A$ is made ON condition, and st the same time, a control signal $C_{SB}$ of the solenoid $SS_B$ is made OFF condition so that the gear position of the speed change mechanism TM in the automatic transmission 2 is controlled to assume the fourth speed.

During running at the fourth speed in the drive range "D", if it is desired to rapidly accelerate in order to outrun another vehicle, the selecting lever 4a is rotated about the supporting shaft 4h in the clockwise direction in FIG. 3 against the return spring 4t so that the selecting lever 4a is moved to the subguide path 4c side through the connection path 4d to thereby turn on the manual mode switch 8, and under this condition, the selecting lever 4a is further rotated about the rotatable shaft 4f as a supporting point in the backward direction in FIG. 2 to turn on the down-shift switch 6 through the switch operating bar 4n.

As a result, since the manual mode switch 8 is turned on at the timing of executing the speed change control processing in FIG. 4, the process proceeds from step S1 to step S4 to bring the selecting lock solenoid 9 in an operating condition and to bring the rotatable lever 4j in a lock condition so that the inhibitor switch 7 is locked to a condition wherein a switch signal corresponding to the drive range "D" is being outputted.

Subsequently, proceeds to step S5, since the overspeed shift flag $F_{OV}$ has been reset to "0", proceeds to step S9 as it is. Here, if the present engine speed $N_E$ is less than the overspeed $N_{OV}$ and within the normal engine speed range, proceeds to step S10. Since the down-shift allowing flag $F_{DS}$ has been reset to "0", proceeds to step S11, and determines whether the down-shift switch 6 is ON condition. If it is ON condition, proceeds to step S12.

In step S12, an engine speed $N_{ED}$ when down shifted is calculated, and if this engine speed $N_{ED}$ is equal to or less than the overspeed $N_{OV}$, proceeds to step S18. In step S18, a value GP=3 to be obtained by subtracting one speed from the present gear position GP (=4) is calculated, and this value is used to update and stored in the gear position storage area. Then proceeds to step S17, and the down-shift allowing flag FDS is reset to "0" and the down-shift allowing elapsed time T1 is cleared to "0". Thereafter, proceeds to step S3, and the control signals $C_{SA}$ and $C_{SB}$ for the shift solenoids $SS_A$ and $SS_B$ are made OFF condition corresponding to a gear position representing the third speed stored in the gear position storage area.

As a result, both the shift solenoids $SS_A$ and $SS_B$ enter non-energized condition, and the gear position of the speed change mechanism TM of the automatic transmission 2 is shifted down to the third speed so that a rapid accelerating condition required to overrun can be obtained.

Similarly, even in the case where the vehicle is running a down slope, and engine brake is needed temporarily, it is possible to shift down to a desired gear position GP by turning ON the shift down switch 6 by the selecting lever 4a.

Here, during running at the third speed or lower in the manual mode with the selecting lever 4a moved to the subguide path 4c, when the accelerator pedal is depressed to enter the accelerating condition, if the engine speed $N_E$ exceeds the overspeed $N_{OV}$, in the speed change control processing shown in FIG. 4, the process proceeds from step S9 to step S21 so that the overspeed shift flag $F_{OV}$ is set to "1", and subsequently, the up-shift elapsed time $T_0$ is cleared to "0" (step S22). Furthermore, a value obtained by adding "1" corresponding to one speed to the present gear position GP stored in the gear position storage area is used as a new gear position GP to update and is stored in the gear position storage area.

As a result, in step S3, the control signals $C_{SA}$ and $C_{SB}$ controlled in response to the gear position GP stored in the gear position storage area are outputted, and the speed change mechanism TM of the automatic transmission 2 is shifted up so that the engine speed $N_E$ is automatically lowered from the overspeed region.

In this manner, when the speed change mechanism TM enters the up shifted condition to prevent the overspeed of the engine 1, in the speed change control processing in FIG. 4, since the overspeed shift flag $F_{OV}$ has been set to "1" in step S5, the process proceeds to step 6, and after the up-shift elapsed time $T_0$ is incremented, proceeds to step S7. However, at this time point, since it is just after the up-shift, the elapsed time $T_0$ is less than the shift manipulation inhibition time $T_1$, thus the timer interruption processing is finished as it is.

As a result, even when the driver requests the up-shift or down-shift by turning ON the up-shift switch 5 or the down-shift switch 6 by manipulating the selecting lever 4a, the process never proceeds to the down-shift judging process in step S11 and to the up-shift judging process in step S19, both the up-shift and the down-shift are inhibited.

And, each time the processing of FIG. 4 is executed, sequentially, the up-shift elapsed time $T_0$ is incremented, and when it reaches the shift manipulation inhibition time T1 or longer corresponding to a speed changing time until a preset up-shift is completed, it is judged that the up-shift due to the overspeed is completed, and proceeds from step S7 to step S8. Then, after resetting the overspeed shift flag $F_{OV}$ to "0", proceeds to step S9 so that the shift inhibiting condition is released.

Under this condition, since the engine speed $N_E$ is lowered below the overspeed $N_{OV}$ due to the completion of the up-shift of the speed change mechanism TM, proceeds to step S10, and since the down-shift allowing flag $F_{DS}$ has been reset to "0", proceeds to step S11 to judge whether the down-shift switch 6 is ON condition. If the down-shift switch 6 is OFF condition, it is judged that the request for the down-shift is not made, and proceeds to step 19 to judge whether the up-shift switch 5 is ON condition. If it is OFF condition, it is judged that the request for the up-shift is not made, and proceeds to step S17 to maintain the down-shift allowing flag $F_{OS}$ at the reset condition to "0", and at the same time, the down-shift request elapsed time $T_1$ is maintained at the cleared condition to "0".

At this time, since the gear position GP stored in the gear position storage area is not changed, the fourth speed position is maintained, and a control signal $C_{SA}$ in the ON condition and the control signal $C_{SB}$ in the OFF condition corresponding to the fourth speed position are respectively outputted to the shift solenoids $SS_A$ and $SS_B$, and the gear position of the speed change mechanism TM is maintained at the fourth speed.

Conversely, for example, during running at the third gear position, when the driver turns ON the up-shift switch 5 by the selecting lever 4a immediately before the engine speed $N_E$ reaches the overspeed $N_{OV}$, under this condition, since the overspeed shift flag $F_{OV}$ has been reset to "0", when the processing of FIG. 4 is executed, the process proceeds from step S5 to step S9, and since the engine speed $N_E$ is equal to or lower than the overspeed $N_{OV}$, the process proceeds to step S10, and since the down-shift flag $F_{DS}$ has been reset to "0", proceeds to step S11.

At this time, since the down-shift switch 6 is OFF condition, the process proceeds to step S19, and since the up-shift switch 5 is ON condition, the process proceeds to step S20. In step S20, the gear position GP (=3) stored in the gear position storage area is read out, and a value obtained by adding "1" to the read-out value is made a new gear position GP (=4) which is used to update and is stored in a predetermined storage area. Then, the process proceeds to step S17 to reset the down-shift allowing flag $F_{DS}$ to "0" and at the same time, to clear the down-shift request elapsed time $T_1$ to "0", and then proceeds to step S3.

Accordingly, a control signal $C_{SA}$ of ON condition and a control signal $C_{SB}$ of OFF condition corresponding to the gear position GP (=4) stored in the gear position storage position are respectively outputted to the solenoids $SS_A$ and $SS_B$ to thereby shift up the gear position of the automatic transmission 2 from the third speed to the fourth speed.

In this manner, when the shift-up is performed in the manual mode, since the engine speed $N_E$ is lowered correspondingly, as mentioned above, the engine speed $N_E$ never exceeds the overspeed $N_{OV}$, and the up-shift operation due to the overspeed as mentioned above is not performed.

On the other hand, when the driver selects the manual mode by the selecting lever 4a and turns ON the down-shift switch 6, in order to perform rapid acceleration or the like immediately after the completion of the shift-up due to the overspeed as mentioned above, since the overspeed shift flag $F_{OV}$ has been reset to "0", the process proceeds directly to step 9 from step S5. However, since the engine speed $N_E$ has been lowered from the overspeed because it is immediately after the completion of the up-shift, the process proceeds to step S10.

In this step S10, since the down-shift allowing flag $F_{DS}$ has been reset to "0", proceeds to step S11, and since the down-shift switch 6 is ON condition, proceeds to step S12. In step S12, the engine speed $N_{ED}$ in the third speed condition after down shifting from the present gear position GP (forth speed) is calculated, and then proceeds to step S13.

At this time, since it is immediately after the up-shift, the engine speed $N_{ED}$ after down-shift calculated in step S12 will exceeds the overspeed $N_{OV}$ so that the process proceeds to step S14 to increment the down-shift request elapsed time T1. However, since the incremented value is less than the down-shift effective time $T_D$, the process proceeds from step S15 to step S16 to set the down-shift allowing flag $F_{DS}$ to "1". Then, proceeds to step S3, however, since the gear position GP stored in the predetermined storage area remains at the fourth speed without being changed, the control signals $C_{SA}$ and $C_{SB}$ corresponding to the gear position are respectively outputted to the solenoids $SS_A$ and $SS_B$, and the gear position of the automatic transmission 2 is maintained at the fourth speed.

As stated above, when the down-shift allowing flag $F_{DS}$ is set to "1", upon executing the speed change control processing of FIG. 4, it will result in that the process proceeds directly to step S12 through steps S1, S4, S5, S9, and S10, and in step S12, the engine speed $N_{ED}$ after the down-shift is calculated, and if this engine speed $N_{ED}$ is exceeding the overspeed $N_{OV}$, the down-shift request elapsed time $T_1$ is incremented similar to that described above, and if this is less than the down-shift effective time $T_D$, the condition in which the down-shift allowing flag $F_{DS}$ is set to "1" is maintained.

Under this condition, when the engine speed $N_{ED}$ at the time of down-shift which is calculated in step S12 reaches the engine overspeed $N_{OV}$ or lower, the process proceeds from step S13 to step S18, and the gear position GP (=4) stored in the gear position storage area is read out, and a value GP =3 obtained by subtracting "1" from the read-out value is calculated. The calculated value is used to update, and is stored in the gear position storage area, and then proceeds to step S17. After the down-shift allowing flag $F_{DS}$ is reset to "0", proceeds further to step S3, and the control signals $C_{SA}$, $C_{SB}$ both being OFF conditions corresponding to the gear position at third speed are outputted to the shift solenoids $SS_A$ and $SS_B$ to down shift the gear position to the third speed thereby to enable to transit to a rapidly accelerating condition.

However, if the engine speed $N_{ED}$ during shift down does not reach the overspeed $N_{OV}$ or lower at the time of down-shift request, and if the down-shift request elapsed time $T_1$ reaches the down-shift effective time $T_D$ or longer, it is judged that it takes too long time from the down-shift request by the driver and that there is a fear of acting engine brake due to the down-shift which is not intended by the driver, and the process proceeds from step S15 to step S17. In step S17, the down-shift allowing flag $F_{DS}$ is reset to "0", and at the same time, the down-shift request elapsed time $T_1$ is cleared to "0", and then proceeds to step S3. However, since the gear position GP of the gear position storage area has not been updated, the gear position of the speed change mechanism TM is maintained at the fourth speed as heretofore.

Furthermore, when it is desired to up-shift the gear position of the speed change mechanism TM, for example, from the second speed position to the third speed position, the manual mode switch 8 is turned ON by the selecting lever 4a, and further, the up-shift switch 5 is turned ON. Then, assuming that the overspeed shift flag $F_{OV}$ has been reset to "0", upon executing the processing of FIG. 4, the process proceeds from step S5 to step S9. If the engine speed $N_E$ is within the normal range, the process proceeds to step S11 through step S10. Since the down-shift switch 6 is OFF condition, proceeds to step S19, and since the up-shift switch 5 is ON condition, proceeds to step S20.

In step S20, the gear position GP (=second speed) stored at present in the predetermined storage position is read out, and a new gear position GP=3 is calculated by adding "1" to the read-out value, and the new gear position GP is stored after updating in a predetermined storage area, and then proceeds to step S17. In step S17, the down-shift allowing flag $F_{DS}$ is reset to "0", and at the same time, the down-shift request elapsed time $T_1$ is cleared to "0", and then, proceeds to step S3. In step S3, control signals $C_{SA}$ and $C_{SB}$ which are both OFF condition are respectively outputted to the shift solenoids $SS_A$ and $SS_B$ to shift-up the speed change mechanism TM to the third speed.

As stated above, in the above-mentioned embodiment, under the condition wherein the manual mode is selected by the selecting lever, when the engine speed $N_E$ exceeds a predetermined overspeed $N_{OV}$, the speed change mechanism TM immediately enters the up-shift condition and the gear position GP is up-shifted. However, when this up-shift operation is decided, since the shift manipulation inhibiting flag $F_{OV}$ is set to "1", the up-shift manipulation and the down-shift manipulation are inhibited until the up-shift operation is completed. As a result, even when the up-shift operation due to the overspeed and the up-shift request by the selecting lever 4a caused by the driver's will are duplicated, it is possible to prevent the duplication of the up-shift operations reliably, and the driver will not feel discrepancy. Furthermore, even when the down-shift request is made during up-shift operation due to the overspeed, since the down-shift is inhibited, it is possible to prevent the overspeed condition from being continued reliably.

Also, in the above-mentioned embodiment, the selecting mechanism 4 is described as to the case wherein the parking range "P", reverse range "R", neutral range "N", drive range "D", second range "2", and first range "1" are sequentially selected by turning the selecting lever 4a, however, the invention is not limited to this, but the drive range "D" is positioned at the last, and the connecting path 4d for selecting the manual mode may be formed at the last correspondingly, and the positions of the ranges may be set arbitrarily.

Also, in the above-mentioned embodiment, it is described as to the case wherein the selecting lever 4a is structured movable between the main guide path 4b and the subguide path 4c, however, the present invention is not limited to this, but, for example, an auto/manual changeover switch may be formed on a grip portion of the selecting lever 4a so that when this switch is OFF condition, the speed change control is performed in accordance with a selected range in an auto mode, whereas when the switch is ON condition, the up-shift or down-shift may be selected by turning of the selecting lever 4a or a manual mode lever provided separately.

Furthermore, in the above-mentioned embodiment, it is described as to the case wherein the shift manipulation inhibiting time $T_1$ set on the basis of the vehicle speed V and the throttle opening degree TH at that time, however, the present invention is not limited to this, but a maximum value of the up-shift speed change time at each predetermined gear position may be set as a fixed value for each gear position, and a maximum value of fixed values of respective gear positions may be set as one shift manipulation inhibiting time $T_1$.

The present invention offers the following advantages.

In the first aspect of the invention, the speed change control apparatus comprises shift control means for up-shifting and down-shifting a speed change stage, engine speed detecting means for detecting an engine speed, overspeed suppressing means for sending an up-shift command to the shift control means when the engine speed detected by the engine speed detecting means reaches a preset maximum speed or higher, and shift inhibiting means for inhibiting a shift by at least manual speed change means until a predetermined time elapses from a start of up-shift control by the shift control means. Owing to this structure, it is possible to inhibit the shift by the manual speed change means during a shift-up operation by the overspeed suppressing means, and when the shift-up request is made in a manual mode during shift-up operation by the overspeed suppressing means, the up-shift operation due to the request is inhibited so that it is possible to prevent the driver from feeling discrepancy. Furthermore, since the down-shift operation is also inhibited during shift-up operation by the overspeed suppressing means, it is possible to suppress the overspeed condition of the engine reliably.

In the second aspect of the invention, since the predetermined time of the shift inhibiting means is set on the basis of either the speed change stage or the throttle opening degree at the present time, the shift inhibiting time during up-shift by the overspeed suppressing means can be set to an optimum time corresponding to the actual up-shift speed change time.

In the third aspect of the invention, since the predetermined time of the shift inhibiting means is set to coincide with a speed change time from the start of speed change until the completion of the speed change, it is possible to release the shift inhibition at timing of finish of the up-shift speed change, and it is possible to control precisely in accordance with the actual speed change operation.

I claim:

1. A speed change control apparatus of an automatic transmission capable of selecting between automatic speed change means for setting a speed change stage automatically in accordance with a running condition and manual speed change means for setting a speed change stage selected by manual manipulation, comprising:

shift control means for shifting to a speed change stage set by the automatic speed change means or the manual speed change means;

engine speed detecting means for detecting an engine speed;

overspeed suppressing means for sending an up-shift command to the shift control means when an engine speed detection value of the engine speed detecting means exceeds a preset overspeed; and shift inhibiting means for inhibiting shift of the shift control means at least by the manual speed change means until a predetermined time elapses from the sending of the up-shift command by the overspeed control means.

2. A speed change control apparatus of an automatic transmission according to claim 1, wherein the predetermined time of said shift inhibiting means is set in accordance with at least one of the speed change stage and the throttle opening degree at the present time.

3. A speed change control apparatus of an automatic transmission according to claim 1, wherein the predetermined time of said shift inhibiting means is set to substantially coincide with a speed change time from a start of speed change until completion of the speed change.

* * * * *